US011351630B2

(12) United States Patent
Tanaka et al.

(10) Patent No.: US 11,351,630 B2
(45) Date of Patent: Jun. 7, 2022

(54) PROCESSING STATE DETECTING DEVICE, LASER PROCESSING MACHINE, AND MACHINE LEARNING DEVICE

(71) Applicant: Mitsubishi Electric Corporation, Tokyo (JP)

(72) Inventors: Nobuaki Tanaka, Tokyo (JP); Teruaki Fukuoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/292,719

(22) PCT Filed: Jan. 21, 2019

(86) PCT No.: PCT/JP2019/001708
§ 371 (c)(1),
(2) Date: May 11, 2021

(87) PCT Pub. No.: WO2020/152757
PCT Pub. Date: Jul. 30, 2020

(65) Prior Publication Data
US 2021/0354234 A1    Nov. 18, 2021

(51) Int. Cl.
*G06F 17/00*        (2019.01)
*B23K 26/03*        (2006.01)
(Continued)

(52) U.S. Cl.
CPC ......... *B23K 26/03* (2013.01); *G01N 29/2418* (2013.01); *G01N 29/4481* (2013.01);
(Continued)

(58) Field of Classification Search
CPC .......... B23K 26/03; G06N 20/00; G06N 5/04; G01N 29/2418; G01N 29/4481; G10L 25/51
(Continued)

(56) References Cited

U.S. PATENT DOCUMENTS 4,960,970 A * 10/1990 Schneiter ............... B23K 26/03
                                                        219/121.6
2010/0164739 A1 * 7/2010 Heberer ............... B23K 26/032
                                                        340/679
(Continued)

FOREIGN PATENT DOCUMENTS

JP          8-90261 A     4/1996
JP     2002-328017 A    11/2002
(Continued)

OTHER PUBLICATIONS

International Search Report and Written Opinion dated Apr. 16, 2019, received for PCT Application PCT/JP2019/001708, Filed on Jan. 21, 2019, 8 pages including English Translation.
(Continued)

*Primary Examiner* — Paul C McCord
(74) *Attorney, Agent, or Firm* — Xsensus LLP

(57) ABSTRACT

A processing state detecting device for detecting a processing state of a workpiece processed by laser processing includes: a sound collecting unit that measures sound while the workpiece is being processed by laser processing; an installation position evaluating unit that determines whether an installation position of the sound collecting unit needs to be changed, on the basis of the sound measured by the sound
(Continued)

collecting unit; and an evaluation result informing unit that provides information on a result of evaluation of the installation position evaluating unit.

16 Claims, 6 Drawing Sheets

(51) Int. Cl.
| | |
|---|---|
| *G06N 20/00* | (2019.01) |
| *G01N 29/24* | (2006.01) |
| *G01N 29/44* | (2006.01) |
| *G06N 5/04* | (2006.01) |
| *G10L 25/51* | (2013.01) |

(52) U.S. Cl.
CPC ............... *G06N 5/04* (2013.01); *G06N 20/00* (2019.01); *G10L 25/51* (2013.01)

(58) Field of Classification Search
USPC .......................................................... 702/56
See application file for complete search history.

(56) References Cited

U.S. PATENT DOCUMENTS

| | | | |
|---|---|---|---|
| 2013/0178953 A1* | 7/2013 | Wersborg | G06N 3/006 700/48 |
| 2017/0220927 A1 | 8/2017 | Takigawa et al. | |
| 2018/0147665 A1 | 5/2018 | Furuya | |
| 2021/0197309 A1* | 7/2021 | Bayram | B23K 31/10 |

FOREIGN PATENT DOCUMENTS

| | | |
|---|---|---|
| JP | 2009-115767 A | 5/2009 |
| JP | 2016-78044 A | 5/2016 |
| JP | 2017-131937 A | 8/2017 |
| JP | 2018-86672 A | 6/2018 |
| JP | 2018-86711 A | 6/2018 |

OTHER PUBLICATIONS

Decision to Grant dated Dec. 10, 2019, received for JP Application 2019-545381, 5 pages including English Translation.

* cited by examiner

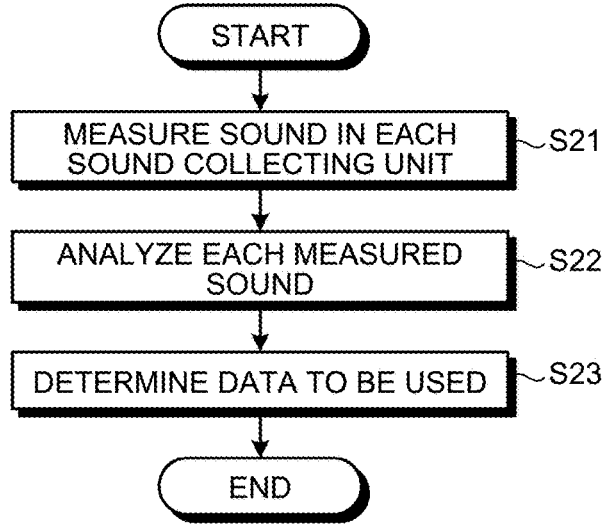
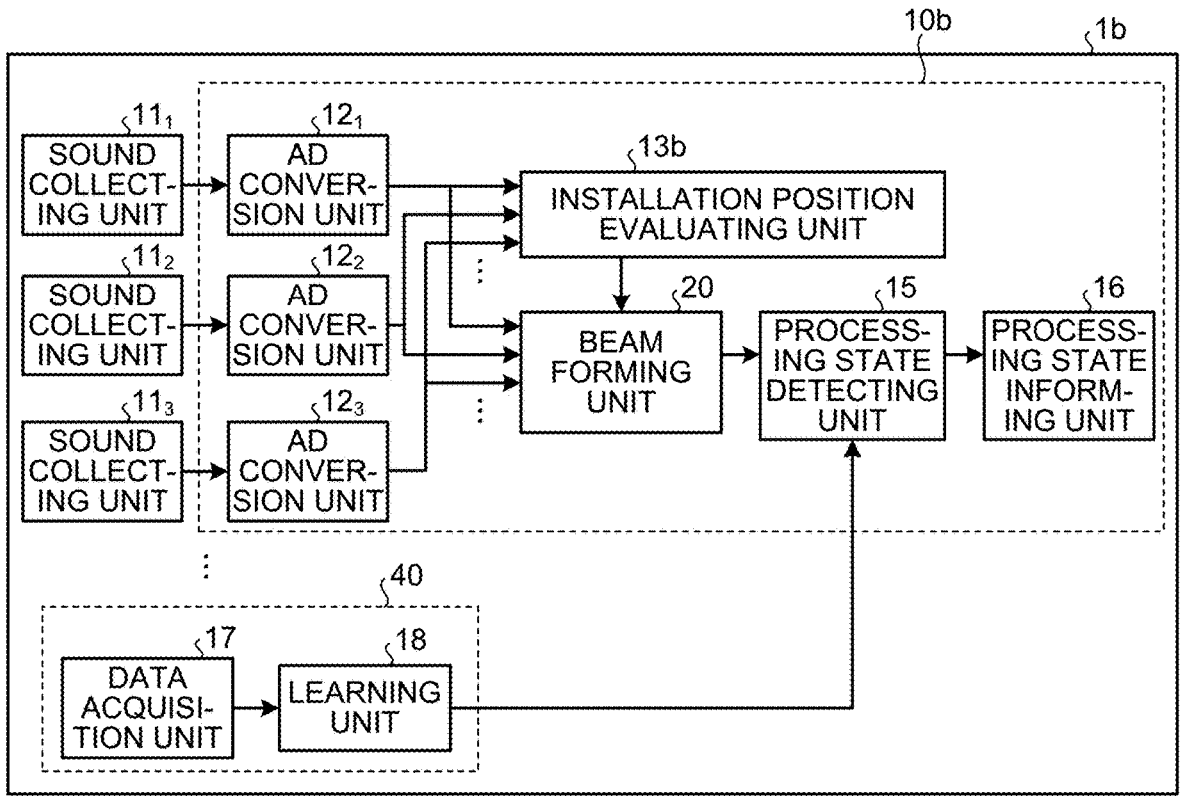

… # PROCESSING STATE DETECTING DEVICE, LASER PROCESSING MACHINE, AND MACHINE LEARNING DEVICE

CROSS-REFERENCE TO RELATED APPLICATION

The present application is based on PCT filing PCT/JP2019/001708, filed Jan. 21, 2019, the entire contents of which are incorporated herein by reference.

FIELD

The present invention relates to a processing state detecting device that detects a processing state of a workpiece in laser processing, a laser processing machine, and a machine learning device.

BACKGROUND

A method of using sound produced during processing to detect a processing state of a workpiece has been proposed as a technique for detecting a processing state of a workpiece in laser processing.

In an inventive technique described in Patent Literature 1, it is determined that laser ablation starts to occur when a change in an acoustic wave output obtained by measuring sound (acoustic wave) produced during laser processing of a workpiece using an acoustic sensor is detected.

CITATION LIST

Patent Literature

Patent Literature 1: Japanese Patent Application Laid-open No. H08-90261

SUMMARY

Technical Problem

In order to achieve accurate detection in measuring sound produced during the laser processing to detect a processing state, the installation position of an acoustic sensor is highly significant. For example, in a case where the installation position of an acoustic sensor is close to a processing point, assist gas emitted from a nozzle of a processing head may be directly sprayed on the acoustic sensor. In this case, since a measurement signal outputted by the acoustic sensor contains wind noise produced by an assist gas being sprayed onto the acoustic sensor, it is difficult to accurately detect a processing state. In contrast, when the position of the acoustic sensor is too far from the processing point, the volume of processing sound to be measured is insufficient, and a sufficient signal-to-noise ratio (SNR) cannot be obtained. In this case as well, it is difficult to accurately detect a processing state.

Thus, in order to accurately detect a processing state, an acoustic sensor needs to be installed at a position where an appropriate balance between the amount of wind noise contained in a measurement signal and the volume of the processing sound can be achieved, but in practice, the volume of processing sound and the gas pressure of the assist gas vary depending on the material of a workpiece. In other words, an appropriate position of an acoustic sensor differs depending on the material of a workpiece. As described above, Patent Literature 1 describes that a processing state is determined on the basis of processing sound (acoustic wave output) obtained by measuring sound produced during laser processing using an acoustic sensor. According to the inventive technique described in Patent Literature 1, however, because the installation position of the acoustic sensor is fixed, a change in the material of a workpiece may get off the balance between the amount of wind noise contained in a measurement signal and the volume of processing sound, thereby possibly leading to deterioration in detection accuracy.

The present invention has been made in view of the above circumstances, and an object thereof is to provide a processing state detecting device capable of improving the accuracy of detection of a processing state.

Solution to Problem

In order to solve the above-mentioned problems and achieve the object, the present invention provides a processing state detecting device for detecting a processing state of a workpiece processed by laser processing, the processing state detecting device comprising: a sound collecting unit to measure sound while the workpiece is being processed by laser processing; an installation position evaluating unit to determine whether an installation position of the sound collecting unit needs to be changed, on the basis of the sound measured by the sound collecting unit; and an evaluation result informing unit to provide information on a result of evaluation of the installation position evaluating unit.

Advantageous Effects of Invention

A processing state detecting device according to the present invention produces an advantageous effect that the accuracy of detection of a processing state can be improved.

BRIEF DESCRIPTION OF DRAWINGS

FIG. 7 is a flowchart illustrating an example of an operation of the processing state detecting device according to the second embodiment.

FIG. 8 is a diagram illustrating an example of a configuration of a processing state detecting device according to a third embodiment.

DESCRIPTION OF EMBODIMENTS

A processing state detecting device, a laser processing machine, and a machine learning device according to exemplary embodiments of the present invention will be described in detail below with reference to the drawings. Note that the present invention is not necessarily limited by these embodiments.

First Embodiment

Figure 1:
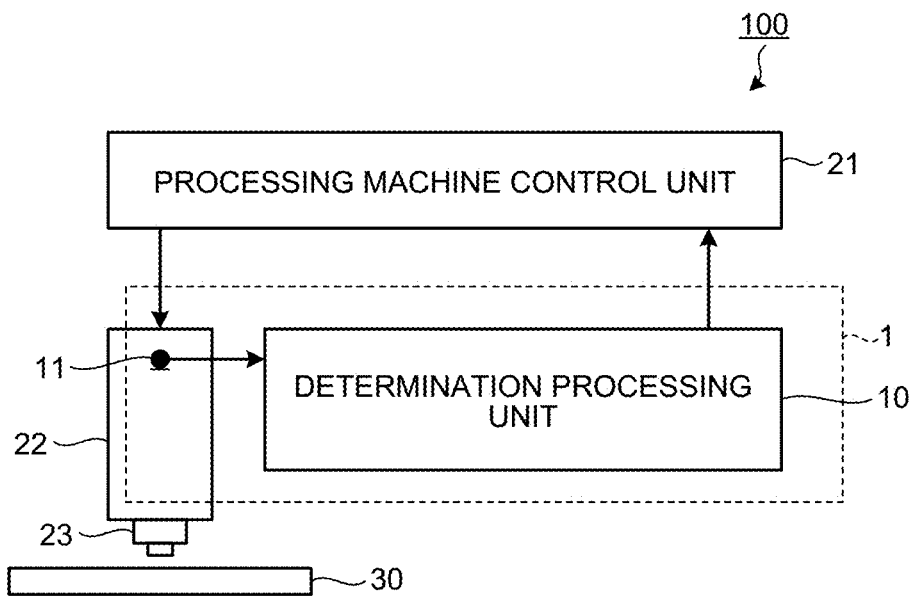
FIG. 1 is a diagram illustrating an example of a configuration of a laser processing machine including a processing state detecting device according to a first embodiment.

FIG. 1 is a diagram illustrating an example of a configuration of a laser processing machine including a processing state detecting device according to a first embodiment. A laser processing machine 100 according to the first embodiment includes a processing state detecting device 1, a processing machine control unit 21, a processing head 22, and a nozzle 23, and processes a workpiece 30 by irradiating the workpiece 30 with laser light. The processing state detecting device 1 includes a sound collecting unit 11 that measures sound, and a determination processing unit 10 that determines whether or not laser processing is performed normally by the laser processing machine 100 and whether or not the position at which the sound collecting unit 11 is installed is appropriate on the basis of a measurement signal outputted from the sound collecting unit 11. The processing state detecting device 1 is a device configured to detect a processing state when the laser processing machine 100 subjects the workpiece 30 to laser processing. Although not illustrated in FIG. 1, the processing state detecting device 1 further includes a data acquisition unit and a learning unit, which will be described later.

The processing machine control unit 21 performs control for laser processing of a workpiece 30, to make adjustment of the position of the processing head 22, irradiation of the workpiece 30 with laser light, emission of assist gas, and the like. The processing head 22 has a leading end to which the nozzle 23 is attached, and applies laser light emitted from a laser oscillator, which is not illustrated, through the nozzle 23 toward the workpiece 30. At the same time, the processing head 22 emits assist gas supplied from an assist gas supplying unit, which is not illustrated, to the outside from the nozzle 23.

Figure 2:
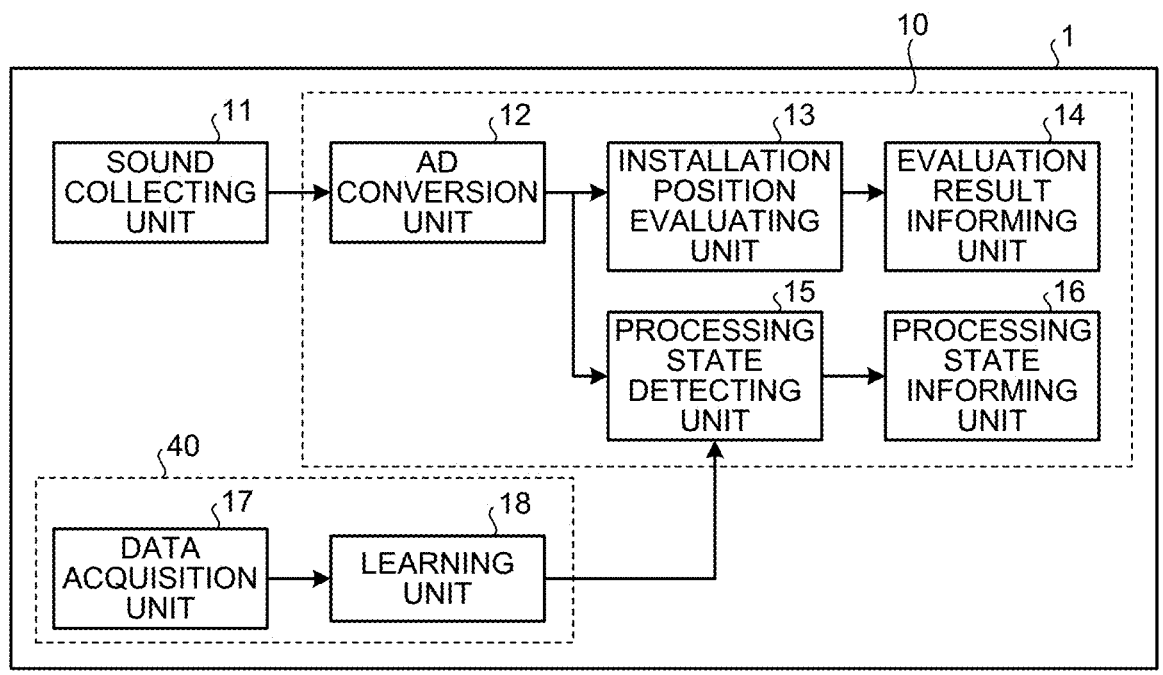
FIG. 2 is a diagram illustrating an example of a configuration of the processing state detecting device according to the first embodiment.

FIG. 2 is a diagram illustrating an example of a configuration of the processing state detecting device according to the first embodiment. The processing state detecting device 1 according to the first embodiment includes the sound collecting unit 11, an analog to digital (AD) conversion unit 12, an installation position evaluating unit 13, an evaluation result informing unit 14, a processing state detecting unit 15, a processing state informing unit 16, a data acquisition unit 17, and a learning unit 18. The AD conversion unit 12, the installation position evaluating unit 13, the evaluation result informing unit 14, the processing state detecting unit 15, and the processing state informing unit 16 constitute the determination processing unit 10. In addition, the data acquisition unit 17 and the learning unit 18 constitute the machine learning device 40.

The sound collecting unit 11 is an acoustic sensor such as a microphone, which is provided inside the processing head 22 of the laser processing machine 100, for example. The sound collecting unit 11 measures sound, that is, collects sound, and generates and outputs a measurement signal representing the collected sound. The sound collected by the sound collecting unit 11 includes processing sound and noise, the processing sound corresponding to sound produced by laser processing of a workpiece 30 performed by the laser processing machine 100. In this specification, some components of the sound collected by the sound collecting unit 11, obtained by subtracting a component of the processing sound from the collected sound are assumed to be noise components. Note that the position at which the sound collecting unit 11 is installed is not limited to the inside of the processing head 22. The sound collecting unit 11 may be installed outside the processing head 22 or may be installed at some portion or component other than the processing head. The sound collecting unit 11 may be installed at any position where the sound collecting unit 11 can measure the processing sound.

The AD conversion unit 12 converts the measurement signal outputted from the sound collecting unit 11 into a digital signal, and outputs a measurement signal in digital form. To avoid complication of explanation, a measurement signal in digital form outputted from the AD conversion unit 12 may simply be referred to as a "measurement signal" in the following description. Note that it is allowable that the processing performed by the AD conversion unit 12 is alternatively performed by the sound collecting unit 11. Specifically, a configuration in which the AD conversion unit 12 is removed and the sound collecting unit 11 outputs a measurement signal in digital form may be used.

The installation position evaluating unit 13 determines whether or not the installation position of the sound collecting unit 11 is appropriate on the basis of the measurement signal outputted from the AD conversion unit 12.

The evaluation result informing unit 14 informs the user of the processing state detecting device 1 of an evaluation result from the installation position evaluating unit 13.

The processing state detecting unit 15 detects a processing state of a workpiece 30 subjected to laser processing performed by the laser processing machine 100, that is, whether or not the laser processing on the workpiece 30 is being normally performed, on the basis of the measurement signal outputted from the AD conversion unit 12.

The processing state informing unit 16 informs the user of the processing state detecting device 1 of a detection result of the processing state from the processing state detecting unit 15.

The data acquisition unit 17 acquires learning data to be used by the learning unit 18 for generating a learning model, described later, from the outside of the processing state detecting device 1.

The learning unit 18 performs machine learning with use of the learning data received from the data acquisition unit 17, and generates a learning model to be used by the processing state detecting unit 15 to detect a processing state of a workpiece 30. The learning unit 18 generates the learning model before the processing state detecting unit 15 starts a process of detecting a processing state of a workpiece 30.

The learning data acquired by the data acquisition unit 17 include measured sound data and data on a processing state, the measured sound data being obtained by digitalizing sound collected while the laser processing machine 100 from which the processing state detecting device 1 is to detect a processing state performs laser processing on the workpiece 30 to form corresponding data. The data on the processing state included in the learning data is data indicating a processing result, that is, whether or not the laser processing has been performed normally, and serves as teacher data for the machine learning. The determination on whether or not the laser processing has been performed normally is made by an operator who uses the laser processing machine 100 visually checking a processed product that is the workpiece 30 after completion of the laser processing. The collection of sound while the laser processing machine 100 performs laser processing of the workpiece 30 is assumed to have been performed by a device (acoustic sensor) similar to the sound collecting unit 11. In addition, the device that collects sound is assumed to be installed at an appropriate position of the processing head 22. The measured sound data is data in the same form as the measurement signal outputted by the AD conversion unit 12 of the processing state detecting device 1. The number of sets of such learning data acquired by the data acquisition unit 17 corresponds to the number thereof necessary for the learning unit 18 to generate a learning model. Although no specific number is defined, it is desirable that the number of learning data sets generated when the laser processing has been normally performed be about the same as the number of learning data sets generated when the laser processing has not been normally performed and the number be as large as possible. As the number of learning data sets acquired by the data acquisition unit 17 is larger, the accuracy of the learning model generated by the learning unit 18 increases, thereby resulting in improvement of the accuracy of detecting a processing state in the processing state detecting unit 15, that is, the accuracy of determination on whether or not a processing state is satisfactory.

Upon receiving the learning data from the data acquisition unit 17, the learning unit 18 analyzes the measured sound data and extracts a feature quantity therefrom. The learning unit 18 extracts the feature quantity by performing FFT (fast Fourier transform) on the measured sound data for each predetermined period to obtain a spectrum and performing filter bank analysis on the obtained spectrum, for example. The learning unit 18 may perform spectrum analysis instead of the filter bank analysis. Subsequently, the learning unit 18 stores the extracted feature quantity in association with data on the processing state included in the learning data. If two kinds of feature quantities are to be extracted from the measured sound data by the learning unit 18, coordinates given by feature vectors having the two kinds of feature quantities as elements have a distribution as illustrated in FIG. 3.

Figure 3:
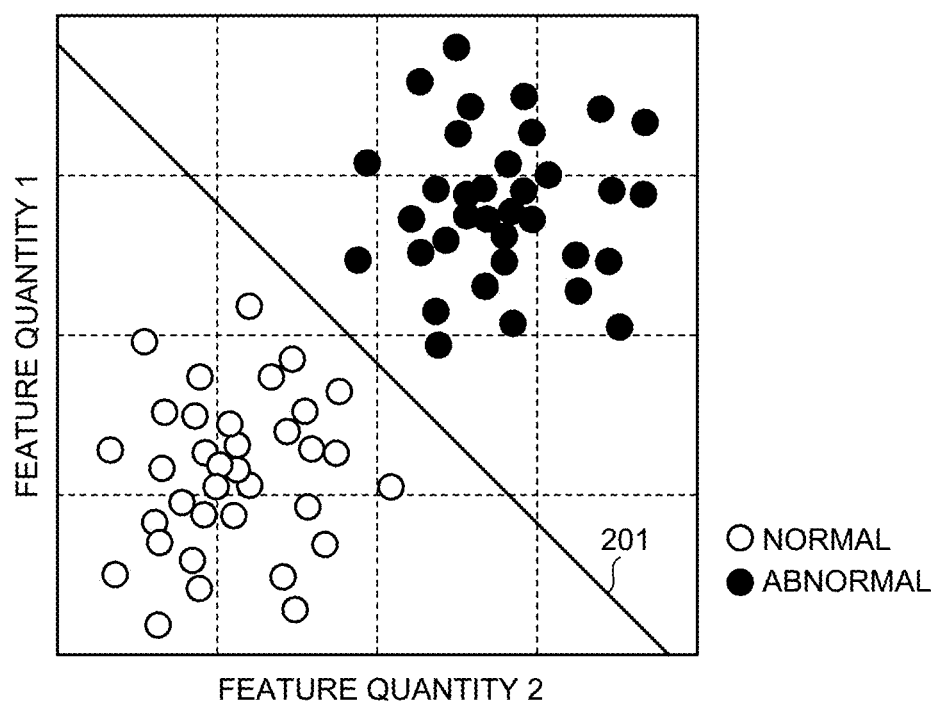
FIG. 3 is a chart for explaining a result of learning performed by a learning unit.

FIG. 3 is a chart for explaining a result of learning performed by the learning unit 18. FIG. 3 illustrates an example of the distribution of the coordinates given by the feature vectors having the feature quantities extracted by the measured sound data as elements. In addition, in FIG. 3, a white circle (○) represents a coordinate corresponding to the feature quantity obtained from the measured sound data when the laser processing has been performed normally, and a black circle (●) represents a coordinate corresponding to the feature quantity obtained from the measured sound data when the laser processing has been performed abnormally. Note that, for simplicity of explanation, FIG. 3 illustrates a learning result when two kinds of feature quantities are used for the learning performed by the learning unit 18. When the learning of the measured sound data is advanced and a sufficient number of feature quantities are obtained, the learning unit 18 obtains a boundary 201 between a first range that is a distribution range of coordinates corresponding to the feature vectors having, as elements, the feature quantities obtained from the measured sound data when the laser processing has been performed normally, and a second range that is a distribution range of coordinates corresponding to the feature vectors having, as elements, the feature quantities obtained from the measured sound data when the laser processing has been performed abnormally. While the case where the number of kinds of feature quantities is two is illustrated in FIG. 3, a boundary is obtained similarly also in a case where the number of kinds of feature quantities is three or larger. Specifically, even when three or more kinds of feature quantities are learned, a certain boundary is present between a first range in which the coordinates corresponding to the feature vectors having, as elements, the feature quantities obtained from the measured sound data when the laser processing has been performed normally are distributed and a second range in which the coordinates corresponding to the feature vectors having, as elements, the feature quantities obtained from the measured sound data when the laser processing has been performed abnormally are distributed. The learning unit 18 uses a mixture normal distribution model, which is also called a Gaussian mixture model (GMM), for example, to determine the boundary 201 between the first range and the second range mentioned above. The learning unit 18 may use a technique such as a support vector machine (SVM), a neural network, deep leaning, or linear discriminant analysis (LDA) to determine the boundary 201 between the first range and the second range mentioned above.

Upon completing generation of a learning model, the learning unit 18 outputs the generated learning model to the processing state detecting unit 15.

While it has been described that the processing state detecting device 1 includes the learning unit 18 and the learning model to be used by the processing state detecting unit 15 is generated inside the processing state detecting device 1, the learning model may be generated by some device external to the processing state detecting device 1. In this case, the data acquisition unit 17 acquires the learning model generated by the external device and passes the learning model to the processing state detecting unit 15.

Upon receiving a measurement signal from the AD conversion unit 12 in a state in which the processing state detecting unit 15 holds a learning model generated by the learning unit 18, the processing state detecting unit 15 analyzes the measurement signal and extracts a feature quantity therefrom. The process of extracting a feature quantity from a measurement signal performed by the processing state detecting unit 15 is similar to the process of extracting a feature quantity from measured sound data in a learning operation when the learning unit 18 generates a learning model. The processing state detecting unit 15 compares the extracted feature quantity with the learning model generated by the learning unit 18 to determine whether or not the laser processing when the measurement signal received from the AD conversion unit 12 is obtained has been performed normally. Specifically, the processing state detecting unit 15 determines whether or not a coordinate obtained from each extracted feature quantity is within the distribution range of coordinates obtained from feature quantities obtained when the laser processing has been performed normally. The processing state detecting unit 15 outputs, to the processing state informing unit 16, the detection result of the processing state indicating whether or not the laser processing has been performed normally.

The processing state informing unit 16 informs the user of the detection result received from the processing state detecting unit 15. The processing state informing unit 16 provides the information on the processing state by means of displaying on a display unit, sounding of a buzzer, lighting of a lamp, which are not illustrated, or something like that. The processing state informing unit 16 may provide information when an abnormal processing state is detected by the processing state detecting unit 15, but not provide information when the processing state is normal. Alternatively, the processing state informing unit 16 may inform the processing machine control unit 21 illustrated in FIG. 1 of an abnormal processing state in addition to the process of informing the user of the abnormal processing state. In this case, upon receiving the information on the abnormal processing state, the processing machine control unit 21 performs such control as automatically stopping the machine processing, or automatically changing a processing parameter to avoid occurrence of a processing fault, for example. Examples of the processing parameter to be changed include an output of the laser, and the height of the processing head 22.

Figure 4:
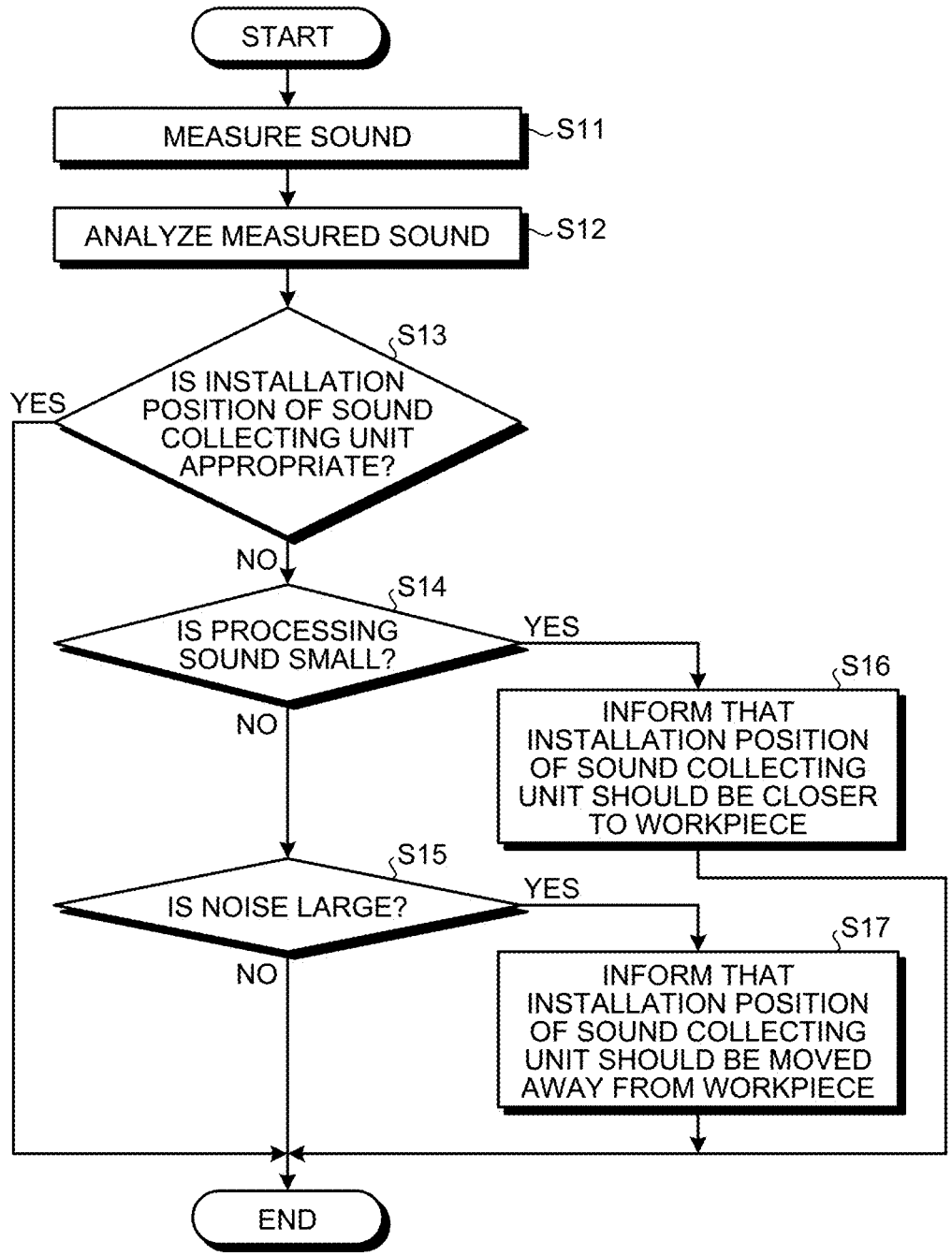
FIG. 4 is a flowchart illustrating an example of an operation of the processing state detecting device according to the first embodiment.

Next, the operation in which the processing state detecting device 1 according to the first embodiment evaluates whether or not the installation position of the sound collecting unit 11 is appropriate will be explained. FIG. 4 is a flowchart illustrating an example of the operation of the processing state detecting device 1 according to the first embodiment. The flowchart given in FIG. 4 illustrates the operation of the processing state detecting device 1 evaluating the installation position of the sound collecting unit 11. The processing state detecting device 1 starts the operation according to the flowchart of FIG. 4 at the same time as the timing when the laser processing machine 100 starts machine processing of the workpiece 30 or a determined time before the timing when the laser processing machine 100 starts the processing.

The processing state detecting device 1 initially measures sound produced when the laser processing machine 100 processes the workpiece 30 (step S11). Specifically, the sound collecting unit 11 measures sound, and outputs a measurement signal indicating the measurement result. Subsequently, the processing state detecting device 1 analyzes the measured sound (step S12). In this step S12, the AD conversion unit 12 first converts the measurement signal outputted from the sound collecting unit 11 into a digital signal, and the installation position evaluating unit 13 analyzes a measurement signal in digital form. Specifically, the installation position evaluating unit 13 obtains processing sound and noise components other than the processing sound included in the measurement signal. The noise components include a wind noise component. Note that the installation position evaluating unit 13 is assumed to hold information on the frequency band of the processing sound. The information on the frequency band of the processing sound is generated by means of a process according to such a manner that the sound collecting unit 11 measures sound in each of a state in which the laser processing machine 100 is not performing laser processing and a state in which the laser processing machine 100 is performing laser processing, and the installation position evaluating unit 13 analyzes two measurement signals in digital form indicating the measurement results, for example. Specifically, frequency spectra of the two measurement signals are firstly obtained, the two frequency spectra are subsequently compared with each other, and then information on the frequency band of the processing sound is generated. The process of generating the information on the frequency band of the processing sound is performed before the processing state detecting device 1 starts the operation of evaluating whether or not the installation position of the sound collecting unit 11 is appropriate.

Subsequently, the processing state detecting device 1 determines whether or not the installation position of the sound collecting unit 11 is appropriate on the basis of the analysis result in step S12 (step S13). The determination in this step S13 is performed by the installation position evaluating unit 13. The installation position evaluating unit 13 determines that the installation position of the sound collecting unit 11 is appropriate if the SNR of the processing sound has a level at which the processing state detecting unit 15 can accurately determine the processing state of the workpiece 30. The installation position evaluating unit 13 determines that the processing state detecting unit 15 can accurately determine the processing state of the workpiece 30 if the SNR of the processing sound is larger than a first threshold that is predetermined, for example. The first threshold to be used by the installation position evaluating unit 13 for the determination process in step S13 is beforehand determined through simulation or the like.

If the installation position of the sound collecting unit 11 is appropriate (step S13: Yes), the processing state detecting device 1 terminates the operation illustrated in FIG. 4. If the installation position of the sound collecting unit 11 is not appropriate (step S13: No), the processing state detecting device 1 determines whether or not the processing sound is small (step S14). Specifically, the installation position evaluating unit 13 determines whether or not the intensity of the processing sound obtained in step S12 is lower than a second threshold that is predetermined. Note that the second threshold used in the determination process in step S14 is different from the first threshold used in the determination process in step S13 described above. The second threshold to be used in the determination process in step S14 is beforehand determined through simulation or the like.

If the processing sound is small (step S14: Yes), the processing state detecting device 1 informs the user that the installation position of the sound collecting unit 11 should be closer to the workpiece 30 (step S16). The informing in this step S16 is performed by the evaluation result informing unit 14. The evaluation result informing unit 14 informs the user that the installation position of the sound collecting unit 11 needs to be closer to the workpiece 30 by means of causing a display device to display the same, or some means like that. The evaluation result informing unit 14 may inform the user by sounding of a buzzer, lighting of a lamp, or the like. After performing step S16, the processing state detecting device 1 terminates the operation illustrated in FIG. 4.

If the processing sound is large, that is, if the intensity of the processing sound is equal to or higher than a third threshold that is predetermined (step S14: No), the processing state detecting device 1 determines whether or not the noise is large (step S15). Specifically, the installation position evaluating unit 13 determines whether or not the intensity of the noise components obtained in step S12 is higher than the third threshold. Note that the third threshold used in the determination process in step S15 is different from the first threshold used in the determination process in step S13 described above and the second threshold used in the determination process in step S14 described above. The third threshold to be used in the determination process in step S15 is beforehand determined through simulation or the like.

If the noise has a low level, that is, if the intensity of the noise components is lower than a predetermined intensity (step S15: No), the processing state detecting device 1 terminates the operation illustrated in FIG. 4. If the noise is large (step S15: Yes), the processing state detecting device 1 informs the user that the installation position of the sound collecting unit 11 should be moved away from the workpiece 30 (step S17). The informing in this step S17 is performed by the evaluation result informing unit 14. The evaluation result informing unit 14 informs the user that the installation position of the sound collecting unit 11 needs to be moved away from the workpiece 30 by means of displaying the same on a display device, or some means like that. The evaluation result informing unit 14 may inform the user by sounding of a buzzer, lighting of a lamp, or the like.

After performing step S17, the processing state detecting device 1 terminates the operation illustrated in FIG. 4.

As described above, in the processing state detecting device 1, the sound collecting unit 11 measures sound produced when the laser processing machine 100 machine-processes a workpiece 30. The installation position evaluating unit 13 determines whether or not the installation position of the sound collecting unit 11 is appropriate, that is, whether the installation position of the sound collecting unit 11 needs to be changed, on the basis of a measurement signal indicating a measurement result of the sound from the sound collecting unit 11. If the installation position of the sound collecting unit 11 needs to be changed, the installation position evaluating unit 13 then determines how the installation position of the sound collecting unit 11 should be changed, on the basis of the intensities of the processing sound and the noise components included in the sound measured by the sound collecting unit 11. The evaluation result informing unit 14 informs the user of the evaluation result from the installation position evaluating unit 13, that is, more specifically, how the installation position of the sound collecting unit 11 should be changed. By so doing, the user of the processing state detecting device 1 can change the installation position of the sound collecting unit 11 to an appropriate position. Thus, when the installation position of the sound collecting unit 11 is deviated from an appropriate position for a reason of a change in the material of the workpiece 30, and/or some other reason, the processing state detecting device 1 can inform the user of necessity to change the installation position of the sound collecting unit 11 to an appropriate position, so that the installation position of the sound collecting unit 11 actually comes to the appropriate position. Thus, the processing state detecting device 1 can detect the processing states of workpieces 30 made of various materials with high accuracy, thereby improving the accuracy of detection of the processing state.

While it has been described that, when the installation position of the sound collecting unit 11 is determined not to be appropriate, the processing state detecting device 1 determines how the sound collecting unit 11 should be changed and informs the user of the same, this informing is not essential. The processing state detecting device 1 only has to inform the user at least that the installation position of the sound collecting unit 11 is not appropriate. When the user is informed that the installation position of the sound collecting unit 11 is not appropriate, the user is expected to change the installation position of the sound collecting unit 11. A change in the installation position improves the accuracy of detecting the processing state in the processing state detecting device 1.

Second Embodiment

Figure 5:
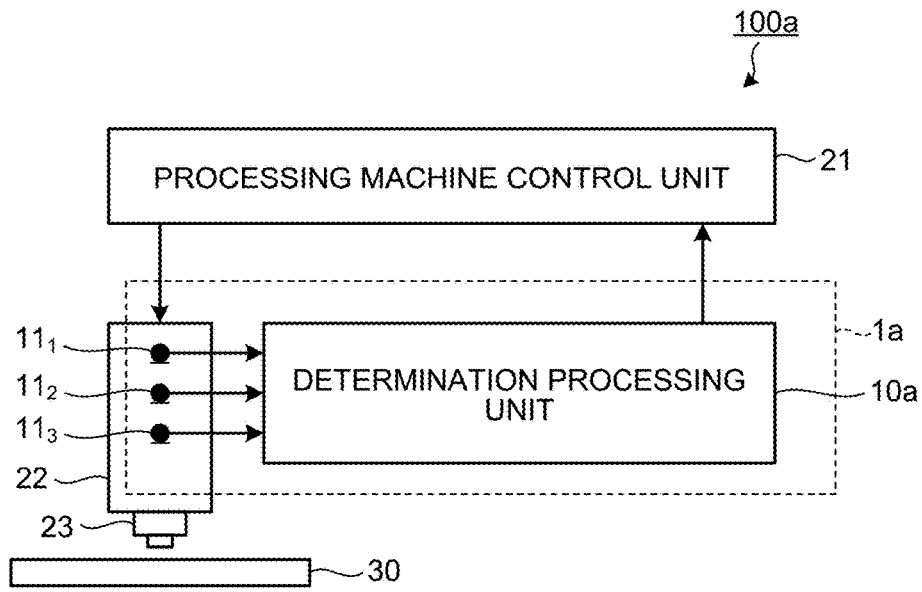
FIG. 5 is a diagram illustrating an example of a configuration of a laser processing machine including a processing state detecting device according to a second embodiment.

FIG. 5 is a diagram illustrating an example of a configuration of a laser processing machine including a processing state detecting device according to a second embodiment. A laser processing machine 100a according to the second embodiment includes a processing state detecting device 1a, the processing machine control unit 21, the processing head 22, and the nozzle 23. Specifically, the laser processing machine 100a has a configuration obtained by replacing the processing state detecting device 1 included in the laser processing machine 100 according to the first embodiment by the processing state detecting device 1a. The configuration of the laser processing machine 100a other than the processing state detecting device 1a is common to that in the first embodiment, and so the description of the components common to those in the first embodiment will not be repeated. The processing state detecting device 1a includes a plurality of sound collecting units $11_1$, $11_2$, and $11_3$ provided in the processing head 22, and a determination processing unit 10a. Although not illustrated in FIG. 5, the processing state detecting device 1a further includes a data acquisition unit 17 and a learning unit 18 in a manner similar to the processing state detecting device 1 according to the first embodiment. While an example in which the processing state detecting device 1a includes three sound collecting units $11_1$, $11_2$, and $11_3$ is illustrated in FIG. 5, the number of sound collecting units included in the processing state detecting device 1a may be two or may be four or more.

Figure 6:
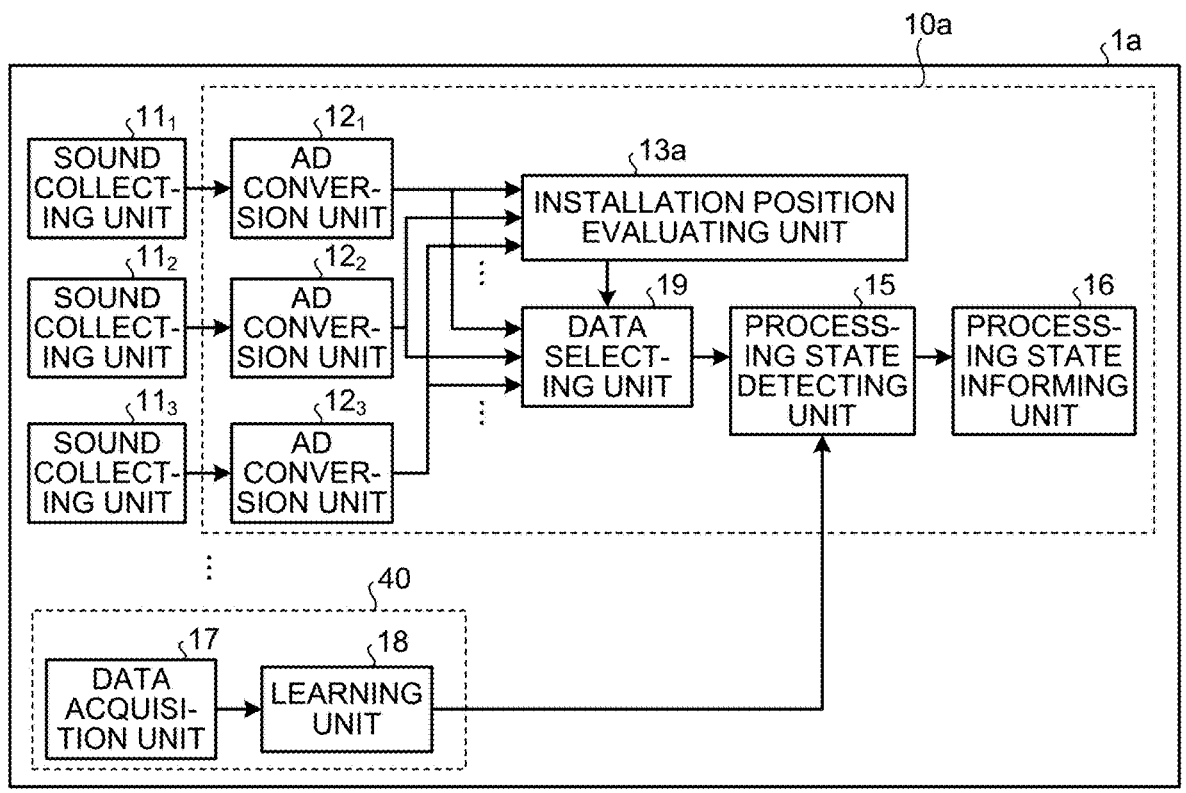
FIG. 6 is a diagram illustrating an example of a configuration of the processing state detecting device according to the second embodiment.

FIG. 6 is a diagram illustrating an example of a configuration of a processing state detecting device 1a according to the second embodiment. The processing state detecting device 1a includes two or more sound collecting units $11_1$, $11_2$, $11_3$, . . . , two or more AD conversion units $12_1$, $12_2$, $12_3$, . . . , an installation position evaluating unit 13a, the processing state detecting unit 15, the processing state informing unit 16, the data acquisition unit 17, the learning unit 18, and a data selecting unit 19. The AD conversion units $12_1$, $12_2$, $12_3$, . . . , the installation position evaluating unit 13a, the processing state detecting unit 15, and the processing state informing unit 16 constitute the determination processing unit 10a.

In the processing state detecting device 1a, the processing state detecting unit 15, the processing state informing unit 16, the data acquisition unit 17, and the learning unit 18 are the same as the processing state detecting unit 15, the processing state informing unit 16, the data acquisition unit 17, and the learning unit 18 of the processing state detecting device 1 according to the first embodiment, respectively. The description of the processing performed by these components will not be repeated.

In the processing state detecting device 1a, the two or more sound collecting units $11_1$, $11_2$, $11_3$, . . . are installed at different positions inside the processing head 22 of the laser processing machine 100a. Note that each of the sound collecting units $11_1$, $11_2$, $11_3$, . . . is the same as the sound collecting unit 11 of the processing state detecting device 1 according to the first embodiment. Thus, the description of the processing performed by the sound collecting units $11_1$, $11_2$, $11_3$, . . . will not be repeated. In the following description, the sound collecting units $11_1$, $11_2$, $11_3$, . . . may be referred to collectively as sound collecting units 11, each sound collecting unit 11, or some other wording.

In addition, each of the AD conversion units $12_1$, $12_2$, $12_3$, . . . of the processing state detecting device 1a is the same as the AD conversion unit 12 of the processing state detecting device 1 according to the first embodiment. Thus, the description of the processing performed by the AD conversion units $12_1$, $12_2$, $12_3$, . . . will not be repeated. Note that, in the following description, the AD conversion units $12_1$, $12_2$, $12_3$, . . . may be referred to collectively as AD conversion units 12, each AD conversion unit 12, or some other wording.

In the processing state detecting device 1a, a measurement signal in digital form, outputted from each of the AD conversion units 12 is inputted to the installation position evaluating unit 13a and the data selecting unit 19.

The installation position evaluating unit 13a compares the qualities of the measurement signals inputted from the AD conversion units 12, and determines the measurement signal to be used by the processing state detecting unit 15 for the process of detecting the processing state of the workpiece 30. The installation position evaluating unit 13a determines a measurement signal with the best SNR, for example, among the inputted measurement signals as a signal to be used for the process of detecting the processing state of the workpiece 30 by the processing state detecting unit 15. The installation position evaluating unit 13a notifies the data selecting unit 19 of the result of determination.

The data selecting unit 19 selects a measurement signal indicated by the determination result of which the data selecting unit 19 is notified by the installation position evaluating unit 13a, from among the measurement signals inputted from the AD conversion units 12, and outputs the selected measurement signal to the processing state detecting unit 15.

FIG. 7 is a flowchart illustrating an example of an operation of the processing state detecting device 1a according to the second embodiment. The flowchart of FIG. 7 illustrates the operation of determining a measurement signal to be used by the processing state detecting unit 15 in the process of detecting the processing state of the workpiece 30. The processing state detecting device 1a starts the operation according to the flowchart of FIG. 7 at the same time as the timing when the laser processing machine 100a starts machine processing of the workpiece 30 or a determined time before the timing when the laser processing machine 100 starts the processing.

In the processing state detecting device 1a, each sound collecting unit 11 initially measures sound produced when the laser processing machine 100a processes the workpiece 30 (step S21).

Subsequently, the processing state detecting device 1a analyzes each measured sound (step S22). In this step S22, each AD conversion unit 12 first converts the measurement signal outputted from the corresponding sound collecting unit 11 on a front stage thereof into a digital signal, and the installation position evaluating unit 13a analyzes the digital measurement signal. Specifically, the installation position evaluating unit 13a obtains processing sound and noise components other than the processing sound included in each of the measurement signals.

Subsequently, the processing state detecting device 1a determines data to be used, that is, a measurement signal to be used by the processing state detecting unit 15 in the process of detecting the processing state of the workpiece 30 (step S23). In this step S23, the installation position evaluating unit 13a calculates the SNR of each of the measurement signals inputted from the AD conversion units 12, and determines a measurement signal with the best SNR to be a measurement signal to be used in the process of detecting the processing state. The installation position evaluating unit 13a notifies the data selecting unit 19 of the determined measurement signal. The data selecting unit 19 selects and outputs the measurement signal of which the data selecting unit 19 is notified by the installation position evaluating unit 13a from among the measurement signals inputted from the AD conversion units 12.

Note that the installation position evaluating unit 13a may hold a reference value for the SNR of a measurement signal that can be used by the processing state detecting unit 15 for the process of detecting the processing state of the workpiece 30, and when none of the SNRs of the measurement signals inputted from the AD conversion units 12 satisfies the reference value, the installation position evaluating unit 13a may inform the user of such a situation to request the user to change the installation position of the sound collecting unit or units 11b.

As described above, the processing state detecting device 1a according to the second embodiment includes a plurality of sound collecting units 11, and is configured to use a measurement signal with the best quality among the measurement signals outputted from the sound collecting units 11 to detect the processing state of the workpiece 30. This can omit the process for the user to correct the installation position of the sound collecting unit 11 that collects sound to be used in the process of detecting the processing state, thereby making it possible to reduce the workload of the user and the time cost.

Third Embodiment

FIG. 8 is a diagram illustrating an example of a configuration of a processing state detecting device 1b according to a third embodiment. The processing state detecting device 1b has a configuration obtained by changing the installation position evaluating unit 13a of the processing state detecting device 1a described in the second embodiment to an installation position evaluating unit 13b and replacing the data selecting unit 19 by a beam forming unit 20. In the present embodiment, the installation position evaluating unit 13b and the beam forming unit 20 that are components differing from those of the processing state detecting device 1a according to the second embodiment will be described, and the description of the other components will be omitted. Note that a laser processing machine including the processing state detecting device 1b according to the third embodiment has a configuration similar to that of the laser processing machine according to the second embodiment. The laser processing machine according to the third embodiment thus has a configuration obtained by replacing the processing state detecting device 1a of the laser processing machine 100a illustrated in FIG. 5 by the processing state detecting device 1b illustrated in FIG. 8.

In the processing state detecting device 1b, measurement signals outputted by the AD conversion units 12 are inputted to the installation position evaluating unit 13b and the beam forming unit 20.

The installation position evaluating unit 13b determines whether or not each of the measurement signals inputted from the AD conversion units 12 satisfies a predetermined reference quality. The installation position evaluating unit 13b obtains the SNR of each of the measurement signals, and determines whether the SNR satisfies a predetermined reference value, for example. The installation position evaluating unit 13b notifies the beam forming unit 20 of the result of determination.

The beam forming unit 20 performs beam forming with use of a measurement signal determined to satisfy the predetermined reference quality by the installation position evaluating unit 13b among the measurement signals inputted from the AD conversion units 12. Specifically, the beam forming unit 20 performs beam forming with use of the measurement signal satisfying the reference quality to generate a measurement signal in which sound coming from a processing point of the laser processing is enhanced. Because the beam forming performed by the beam forming unit 20 is in accordance with procedures of typical beam forming that has been used conventionally, the explanation thereof will not be provided. The beam forming unit 20 outputs a signal generated by beam forming to the processing state detecting unit 15.

As described above, the processing state detecting device 1b according to the third embodiment includes a plurality of sound collecting units 11, and performs beam forming with use of a measurement signal that satisfies a reference quality among the measurement signals outputted from the sound collecting units 11 to generate a signal to be used in the process of detecting the processing state. As a result, in a case where a noise source such as another laser processing machine is present around a laser processing machine whose processing state is to be detected, the influence of noise caused by the noise source can be reduced. This enables the processing state to be detected with higher accuracy.

Figure 9:
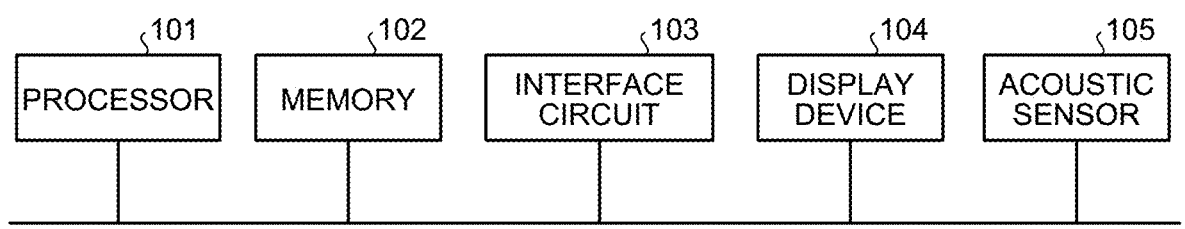
FIG. 9 is a diagram illustrating an example of a configuration of hardware by which the processing state detecting devices according to the first to third embodiments are implemented.

Next, a hardware configuration of the processing state detecting devices 1, 1a, and 1b described above in the embodiments will be described. FIG. 9 is a diagram illustrating an example of a configuration of hardware for implementing the processing state detecting devices according to the first to third embodiments.

The processing state detecting devices 1, 1a, and 1b can be implemented by hardware parts illustrated in FIG. 9, that is, specifically, a processor 101, a memory 102, an interface circuit 103, a display device 104, and an acoustic sensor 105.

The processor 101 is a central processing unit (CPU; also referred to as a central processing device, a processing device, a computing device, a microprocessor, a microcomputer, or a digital signal processor (DSP)), a system large scale integration (LSI), or the like. In addition, the memory 102 is a random access memory (RAM), a read only memory (ROM), a flash memory, an erasable programmable ROM (EPROM), an electrically erasable programmable ROM (EEPROM) (registered trademark) or the like. The interface circuit 103 is a circuit for sending data to and receiving data from a device external to the processing state detecting devices 1, 1a, and 1b. The display device 104 is a liquid crystal monitor, a display, or the like. The acoustic sensor 105 is a microphone or the like.

For implementing the processing state detecting device 1, the AD conversion unit 12, the installation position evaluating unit 13, the evaluation result informing unit 14, the processing state detecting unit 15, the processing state informing unit 16, the data acquisition unit 17, and the learning unit 18 of the processing state detecting device 1 are implemented by the processor 101 and the memory 102. Specifically, the AD conversion unit 12, the installation position evaluating unit 13, the evaluation result informing unit 14, the processing state detecting unit 15, the processing state informing unit 16, the data acquisition unit 17, and the learning unit 18 are implemented by causing the memory 102 to store programs for realizing operations of these units and causing the processor 101 to read and execute the programs stored in the memory 102. In addition, the sound collecting unit 11 of the processing state detecting device 1 is implemented by the acoustic sensor 105.

Note that the interface circuit 103 illustrated in FIG. 9 is used when the data acquisition unit 17 acquires the learning data described above. The display device 104 is used when the evaluation result informing unit 14 provides information on an evaluation result and when the processing state informing unit 16 provides information on a result of detection of a processing state.

While an example for implementation of the processing state detecting device 1 has been described, the processing state detecting devices 1a and 1b are implemented in a similar manner.

The configurations presented in the embodiments above are examples of contents of the present invention, and can each be combined with other publicly known techniques and partly omitted and/or modified without departing from the scope of the present invention.

REFERENCE SIGNS LIST 1, 1a, 1b processing state detecting device; 10, 10a determination processing unit; 11, $11_1$, $11_2$, $11_3$ sound collecting unit; 12, $12_1$, $12_2$, $12_3$ AD conversion unit; 13, 13a, 13b installation position evaluating unit; 14 evaluation result informing unit; 15 processing state detecting unit; 16 processing state informing unit; 17 data acquisition unit; 18 learning unit; 19 data selecting unit; 20 beam forming unit; 21 processing machine control unit; 22 processing head; 23 nozzle; 30 workpiece; 40 machine learning device; 100, 100a laser processing machine.

The invention claimed is:

1. A processing state detecting device for detecting a processing state of a workpiece processed by laser processing, the processing state detecting device comprising:
    a sound collecting unit including a sensor and configured to measure sound while the workpiece is being processed by laser processing;
    an installation position evaluating circuit to determine whether an installation position of the sound collecting unit needs to be changed with respect to a position of a processing head for irradiating the workpiece, on the basis of the sound measured by the sound collecting unit; and
    an evaluation result informing circuit to provide information on a result of evaluation of the installation position evaluating circuit.

2. The processing state detecting device according to claim 1, wherein
    the sound collecting unit is provided to a processing head for irradiating the workpiece with laser light.

3. The processing state detecting device according to claim 1, wherein
    when a signal-to-noise ratio of the sound is higher than a predetermined first threshold, the installation position evaluating circuit generates an evaluation result indicating that the installation position of the sound collecting unit need not be changed.

4. The processing state detecting device according to claim 1, wherein
    when a signal-to-noise ratio of the sound is equal to or lower than a predetermined first threshold, the installation position evaluating circuit checks an intensity of processing sound that is a sound component produced by laser processing of the workpiece among components contained in the sound, and when the intensity of the processing sound is lower than a predetermined second threshold, the installation position evaluating circuit generates an evaluation result indicating that the sound collecting unit needs to be closer to the workpiece.

5. The processing state detecting device according to claim 1, wherein
    when a signal-to-noise ratio of the sound is equal to or lower than a predetermined first threshold, the installation position evaluating circuit checks an intensity of noise that is components other than a sound component produced by laser processing of the workpiece among components contained in the sound, and when the intensity of the noise is higher than a predetermined third threshold, the installation position evaluating circuit generates an evaluation result indicating that the sound collecting unit needs to be moved away from the workpiece.

6. The processing state detecting device according to claim 1, comprising:
    a plurality of sound collecting units each being equivalent to the sound collecting unit, wherein
    the installation position evaluating circuit determines a measurement signal with a best signal-to-noise ratio among measurement signals representing sounds measured by the sound collecting units, respectively, to be a measurement signal to be used in a process of detecting the processing state.

7. The processing state detecting device according to claim 6, further comprising:
a processing state detecting circuit to hold a learning model generated through machine learning performed using sound produced in laser processing of the workpiece and a result of the laser processing of the workpiece, and detect the processing state with use of the measurement signal determined by the installation position evaluating circuit and the learning model.

8. The processing state detecting device according to claim 1, comprising:
a plurality of sound collecting units which are each equivalent to the sound collecting unit, wherein
the installation position evaluating circuit determines a measurement signal with a signal-to-noise ratio satisfying a reference among measurement signals representing sounds measured by the sound collecting units, respectively, to be a measurement signal to be used in a process of detecting the processing state, and
the processing state detecting device performs beam forming using the measurement signal with the signal-to-noise ratio satisfying the reference to generate a signal to be used in the process of detecting the processing state.

9. The processing state detecting device according to claim 8, further comprising:
a processing state detecting circuit to hold a learning model generated through machine learning performed using sound produced in laser processing of the workpiece and a result of the laser processing of the workpiece, and detect the processing state with use of the signal generated by the beam forming and the learning model.

10. The processing state detecting device according to claim 1, wherein the sound collecting unit is installed inside a processing head.

11. A laser processing machine comprising the processing state detecting device according to claim 1.

12. A machine learning device for generating a learning model to be used in detecting a processing state of a workpiece by a processing state detecting device including a sound collecting unit having a sensor and configured to measure sound while the workpiece is processed by laser processing, an installation position evaluating circuit to determine whether an installation position of the sound collecting unit needs to be changed with respect to a position of a processing head for irradiating the workpiece, on the basis of the sound measured by the sound collecting unit, and an evaluation result informing circuit to provide information on a result of evaluation of the installation position evaluating circuit, the machine learning device comprising:
a data acquisition circuit to acquire measured sound data and a processing result of the workpiece, the measured sound data being obtained by converting sound measured while a laser processing machine whose processing state is to be detected by the processing state detecting device performs laser processing on the workpiece into data; and
a learning circuit to generate the learning model on the basis of the measured sound data and the processing result.

13. The processing state detecting device according to claim 1, wherein the installation position is inside the processing head, outside the processing head, or at some portion other than the processing head.

14. The processing state detecting device according to claim 1, wherein the installation position is at some portion or component other than the processing head.

15. The processing state detecting device according to claim 1, wherein the installation position evaluating circuit determines whether the installation position of the sound collecting unit is too close to the workpiece or too far from the workpiece based on an intensity of the sound measured by the sound collecting unit.

16. The processing state detecting device according to claim 1, wherein the evaluation result informing circuit informs a user of the information on the result of evaluation of the installation position evaluating circuit.

* * * * *